United States Patent [19]
Malissin et al.

[11] 3,963,863
[45] June 15, 1976

[54] DEVICE FOR READING OUT INFORMATION RECORDED UPON A SUBSTRATE

[75] Inventors: Roland Malissin; Lucien Lainez, both of Paris, France

[73] Assignee: Thomson-Brandt, Paris, France

[22] Filed: Mar. 14, 1974

[21] Appl. No.: 451,371

[30] Foreign Application Priority Data
Mar. 19, 1973  France .............................. 73.09717

[52] U.S. Cl. ...................... 178/6.6 R; 178/6.6 DD; 178/6.7 A; 179/100.3 V; 179/100.4 R
[51] Int. Cl.² ......................................... G11B 17/00
[58] Field of Search ............. 179/160.3 V, 100.4 R, 179/100.41 L; 178/6.7 A, 6.6 R; 360/97, 86, 102, 103; 346/137

[56] References Cited
UNITED STATES PATENTS

| | | |
|---|---|---|
| 3,138,669 | 6/1964 | Rabinow et al. ............. 179/100.3 V |
| 3,174,140 | 3/1965 | Hagopian et al. .................... 360/97 |
| 3,287,563 | 11/1966 | Clunis .......................... 179/100.3 V |
| 3,304,544 | 2/1967 | Johnson ............................... 360/97 |
| 3,842,197 | 10/1974 | Broussaud .................. 179/100.3 V |

*Primary Examiner*—Raymond F. Cardillo, Jr.
*Attorney, Agent, or Firm*—Cushman, Darby & Cushman

[57]  ABSTRACT

A pick-up device particularly suitable for optical read-out of video-frequency discs, comprising a fixed pick-up and a mobile plate, element of which, carrying the recording substrate, is mobile. The transfer of the recording tracks before the pick-up is produced by a rotational movement on the part of the carrier element, in association with a rectilinear displacement $d_1$ on the part of said carrier element in relation to the fixed pick-up, this displacement being associated with the rotational speed of the carrier element and with the pitch of the recording tracks.

14 Claims, 7 Drawing Figures

DEVICE FOR READING OUT INFORMATION RECORDED UPON A SUBSTRATE

The present invention relates to a device for reading out information recorded on a substrate or carrier which may be a flexible or rigid disc.

A device of this kind generally comprises a plate upon which the recording substrate or carrier can be placed, and a pick-up in order to read out the recorded information.

Where optical read-out of video frequency information is concerned, the pick-up comprises a radiant energy source, such for example as a laser, and it is desirable to maintain the pick-up in a fixed position, the pick-up being relatively bulky and requiring excellent stability if it is to operate properly.

However, the pick-up head is generally arranged astride or above the recording substrate and in the case of a fixed pick-up there must be facility for adequately displacing the assembly of the plate or the element assigned to receive the recording substrate, in order to give them proper clearance in relation to the pick-up.

In accordance with the invention, there is provided a device for the optical read-out of a recording substrate comprising at least one track carrying information, said device comprising: a base; a pick-up comprising a radiant energy source and a head, receiving said radiant energy and projecting a reading spot on said track, said pick-up being fixed on said base and having no contact with said substrate; a plate designed to receive said substrate and comprising a driving gear of said substrate, and means for displacing said substrate, designed for maintaining said spot on said track, during the reading out, said driving gear being movable in relation to said base, under the action of said displacing means, and having a travel long enough to make it possible to retract said substrate beyond said pick-up.

For a better understanding of the invention and to show how the same may be carried into effect, reference will be made to the following description and the attached figures among which:

FIG. 1 illustrates a plate system of known type, comprising:

Figure 1:
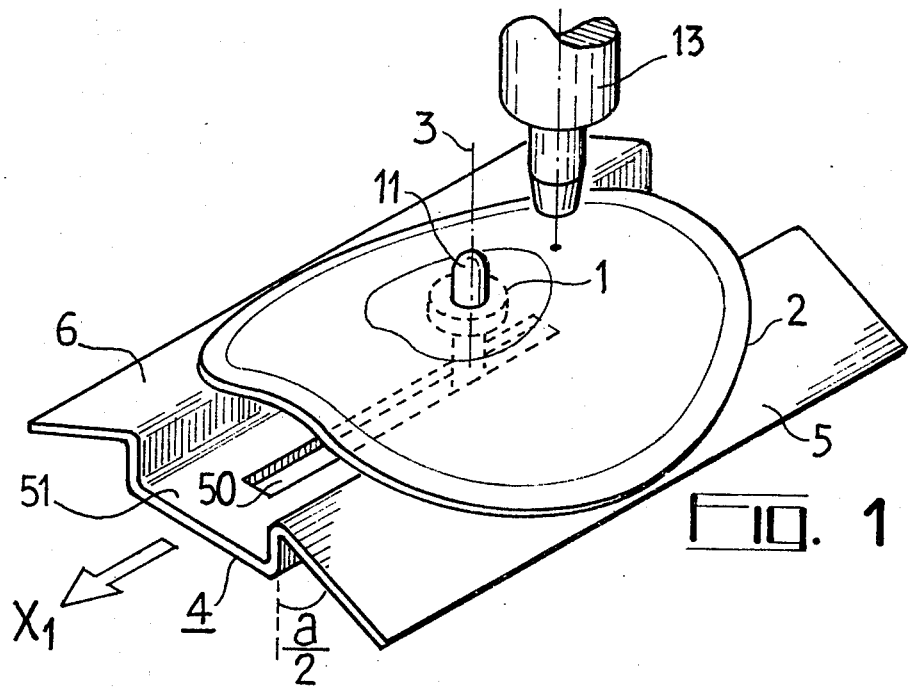
FIGS. 1 and 2 represent two examples of plates which can be used in the device in accordance with the invention.

a carrier element constituted by a shaft 11 with a shoulder 1 designed to carry a flexible disc 2 acting as recording substrate;

a motor (not shown in FIG. 1) fixed to said carrier element and causing it to rotate about an axis 3;

a block 4 with two polished walls 5 and 6 making an angle $a$ with one another, separated by a gutter 51, comprising a slot 50 the use of which is given hereinafter, the flexible disc 2 being applied on the walls 5 and 6 through the medium of an air cushion.

Figure 2:
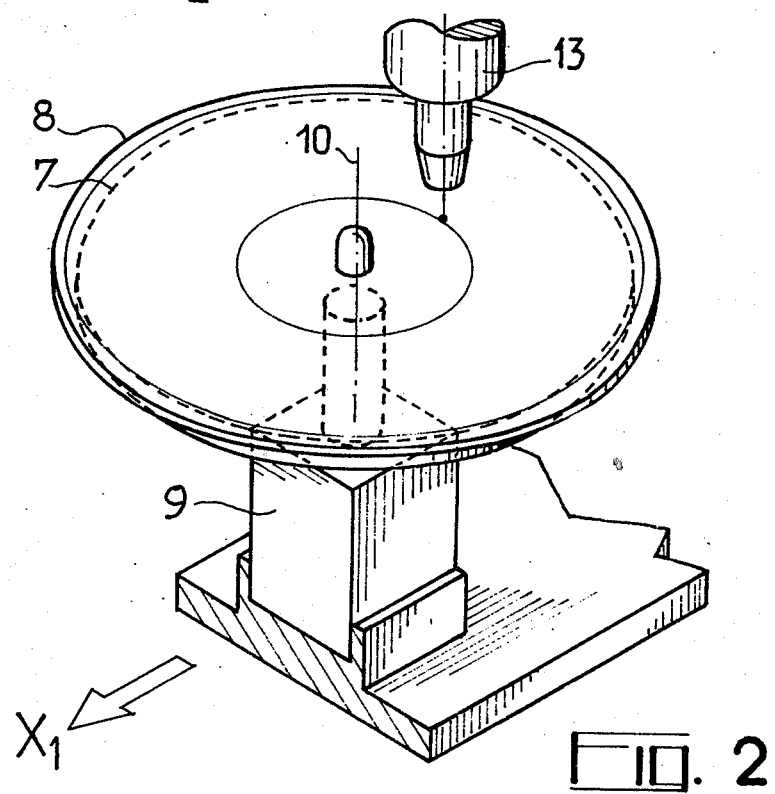

FIG. 2 illustrates another known kind of plate system, comprising a carrier element in the form of a circular table 7, intended to receive a rigid disc 8, said table 7 being fixed to a motor 9 which rotates it about an axis 10.

Figure 3:
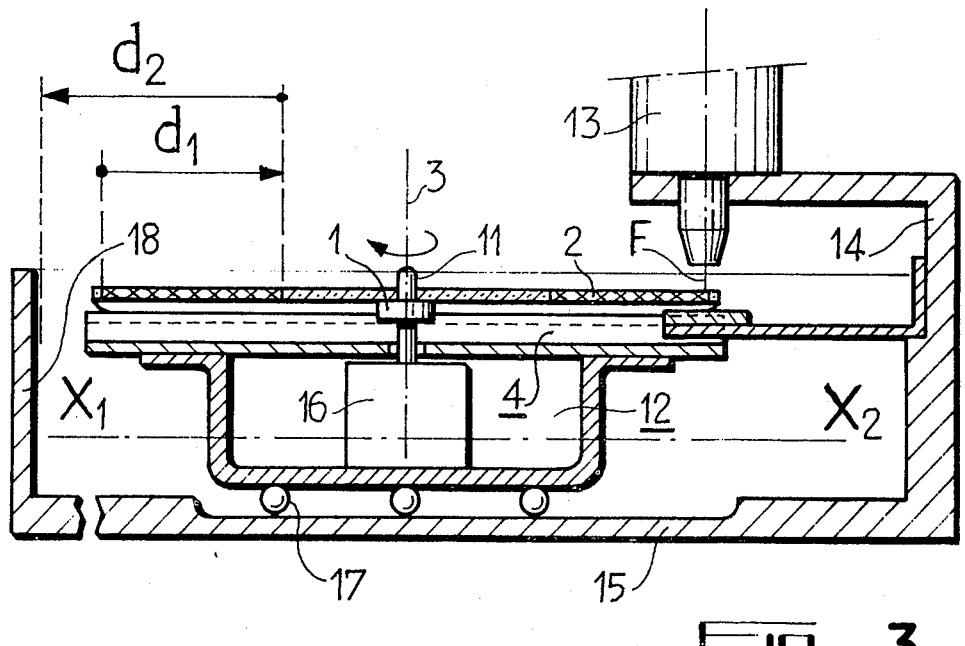
FIG. 3 shows a first embodiment of a device in accordance with the invention.

FIG. 3 illustrates a pick-up device in accordance with the invention, utilising a plate system 12 of the kind shown in FIG. 1, but shown in FIG. 3 in section along the gutter 51. This device comprises a pick-up 13, comprising a radiated energy source designed for the optical read-out of the recording substrate which, in this case, is a flexible disc 2. The pick-up 13 is fixed to an arm 14 rigidly attached to a fixed base 15.

The plate system 12, in addition to the block 4 as shown in FIG. 1, comprises a motor 16 which rotates the carrier element constituted by the shaft 11 with the flat shoulder 1 designed to receive the flexible disc 2.

Read-out of said flexible disc 2 is effected by means of the fixed pick-up 13 before which the track, formed by the information recorded on the flexible disc 2, passes, the transfer of these pieces of information being produced on the one hand by the rotation of the disc 2 around the axis 3, and on the other hand, by a rectilinear displacement $d_1$ either of the assembly of the plate 12, or solely of the element 1 carrying the flexible disc 2, said displacement $d_1$ taking place on a straight line $X_1 X_2$ substantially perpendicular both to the radiant energy beam and to the recording track. In the second instance, the block 4 which has inclined walls 5 and 6 (only visible on FIG. 1), is equipped with the longitudinal slot 50 enabling the element 1 to displace in the direction $X_1 X_2$.

In both cases, the displacement $d_1$ is equal to the effective radial length of the disc 2.

The pick-up 13 being fixed, it is necessary to be able to retract the assembly of the plate 12, or simply the carrier element 1, from same in order to be able to position or remove the disc 2 from its carrier element, without any difficulty. To do this, it is arranged for the plate 12 to displace by a distance $d_2$ along the straight line $X_1 X_2$, this displacement $d_2$ being added to the displacement $d_1$ required for the read-out function.

Figure 4:
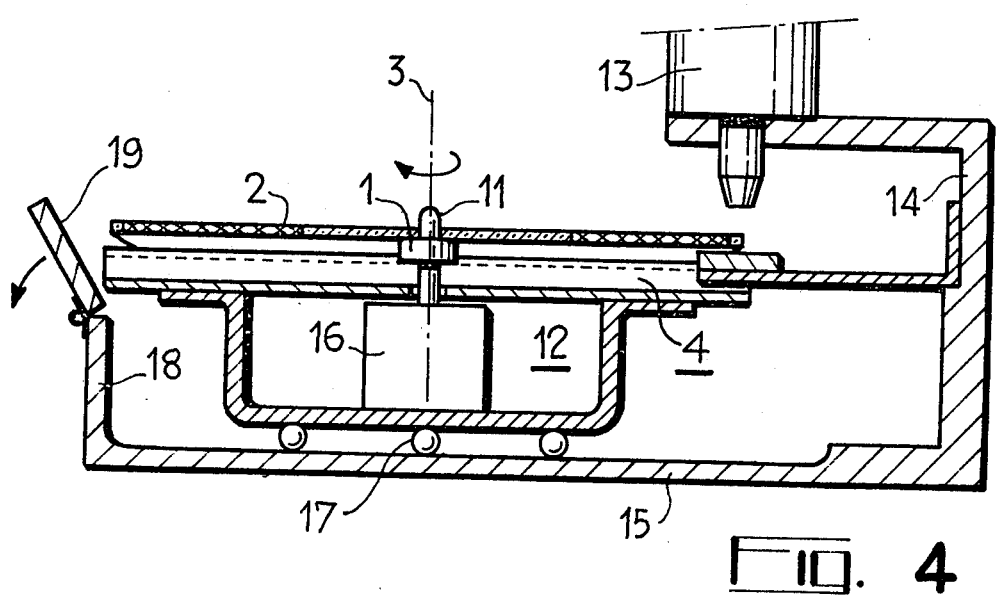
FIG. 4 shows a variant embodiment of FIG. 3 in which the bulkiness of said device is reduced.

Means which allow the moving plate 12 to slide over the fixed base 15 (ball tracks 17 for example), enable these displacements $d_1$ and $d_2$ to take place. A lateral wall 18 designed to protect the plate 12, is integral with the fixed base 15. In the embodiment shown in FIG. 4, said protective wall 18 is equipped at least at its top portion, with a flap 19 which can be pivoted away at the time of retraction of the plate 12 in relation to the fixed pick-up 13. This solution enables the overall assembly of the device to have a smaller size.

Figure 5:
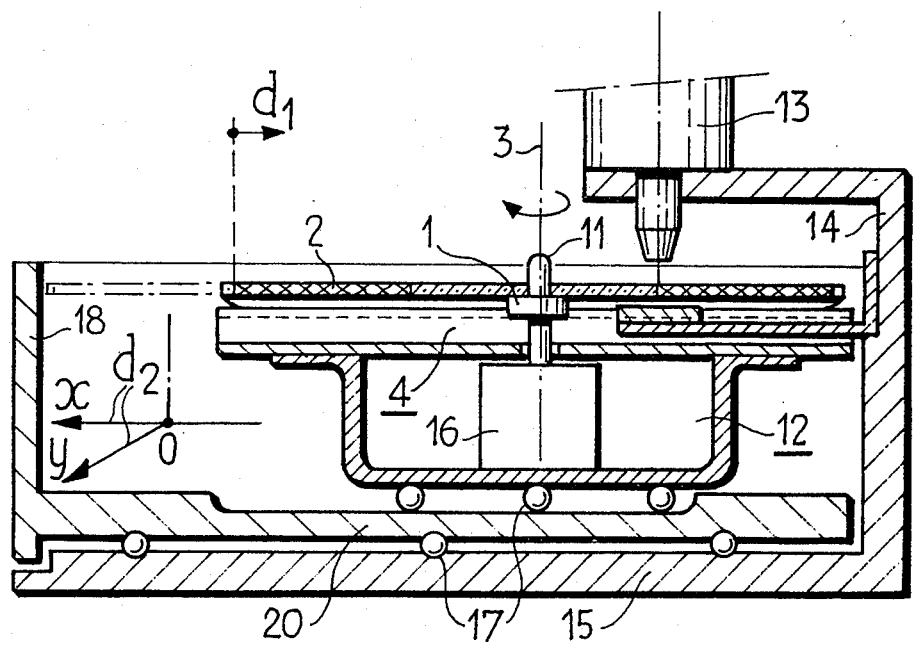
FIG. 5 is a variant embodiment of FIG. 3.

FIG. 5 illustrates another embodiment of the device in accordance with the invention, which, as before, comprises a mobile plate 12 and a fixed pick-up 13.

The plate is carried by an intermediate base 20 and can displace in relation thereto. Said intermediate base 20 is itself mobile in relation to the fixed base 15.

The displacement $d_1$ of the plate 12 or the carrier element 1, in relation to the intermediate base 20, provides the appropriate transfer of the disc in relation to the pick-up 13, whilst the displacement $d_2$ of the intermediate base 20 in relation to the fixed base 15, enables the plate 12 to be retracted, the said plate then being maintained stationary in relation to the intermediate base 20.

Said displacement $d_2$ can take place either along the straight line $ox$ in the direction indicated by the arrow in FIG. 5, or in another direction $oy$ which may be a direction perpendicular to the direction of the straight line $ox$ for example.

Figure 6:
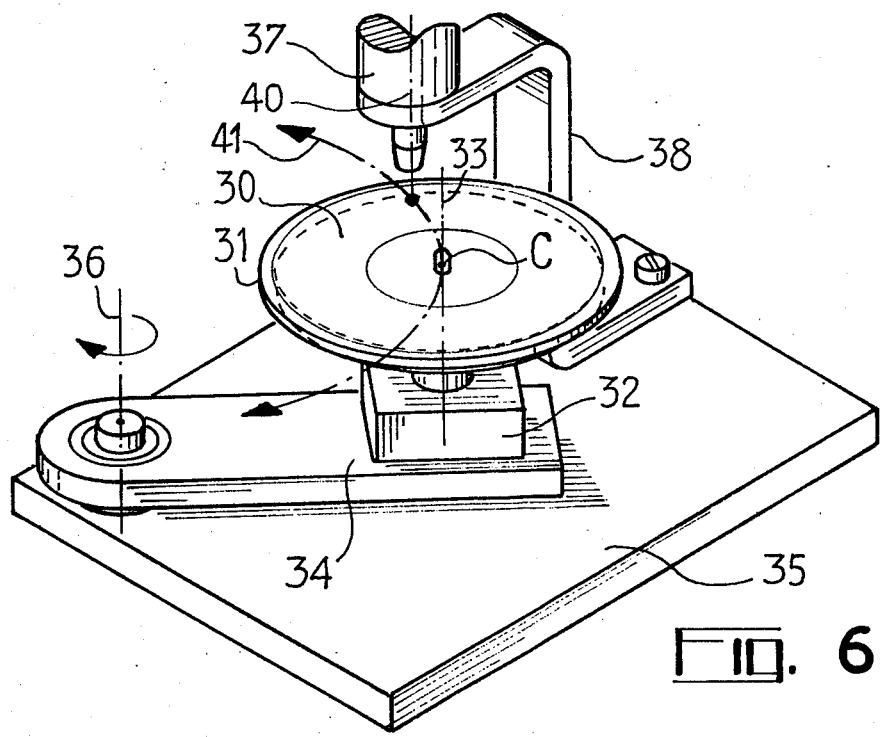
FIG. 6 is a second embodiment of the invention according to the plate illustrated on FIG. 2.

The device in accordance with the invention can also be designed in the manner shown in FIG. 6.

The carrier element is a circular table 30 designed to receive the recording substrate which, in the chosen example, is a rigid disc 31. Said table 30 is integral with a motor 32 which causes it to rotate about an axis 33. The motor unit 32 is fixed to a mobile base 34 itself resting upon a fixed base 35. The base 34 can pivot about an axis 36 so that it acquires an angular displacement which, associated with the rotational movement of the table 30 about the axis 33, enables the disc 31 to be read out by means of a pick-up 37 which, in the case of optical read-out, comprises a radiant energy source (not shown in FIG. 6). The pick-up is attached in a rigid fashion to the fixed base 35, through an arm 38.

The axis of pivot 36 of the intermediate base 34 is parallel to the axis 33 of rotation of the disc 31 and is disposed equidistantly from the centre C of the disc 31 and the pick-up axis 40. The transfer of the information track in front of the pick-up 37 is produced, in this case, by simultaneous movements of rotation on the part of the disc 31 about the axis 33, and of angular displacement $\theta$ by said disc 31 about the pivot axis 36, reading taking place along a circular arc 41 whose radius of curvature will be chosen appropriately.

Figure 7:
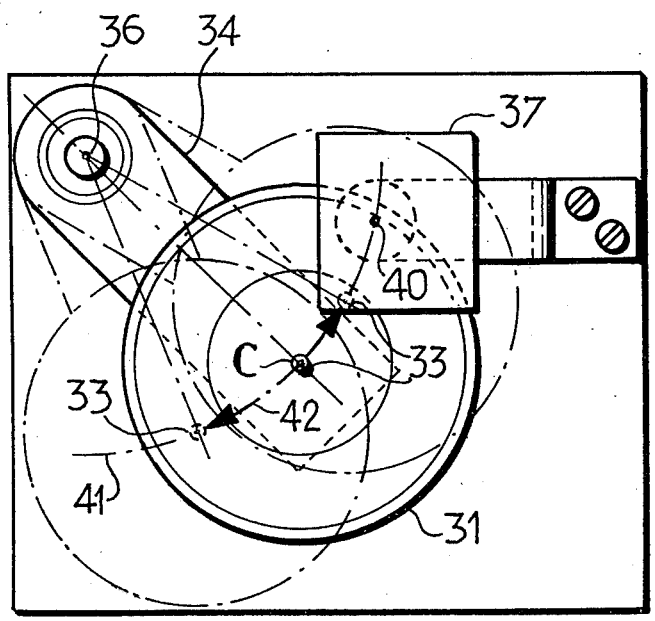
FIG. 7 is an explanatory scheme relating to FIG. 6.

FIG. 7 schematically illustrates the displacement of the disc 31 in relation to the pick-up 37 and more particularly in relation to the pick-up axis 40.

The angular displacement $\theta$ of the mobile base 34 carrying the table, is such that it enables easy retraction of the disc 31 from the pick-up 37.

The examples illustrated are in no way intended as a limitation of the scope of the invention and the pick-up device shown in FIG. 6, which utilizes a plate for a rigid disc 31, could equally well utilize a plate for a flexible disc 2 such as that shown in FIG. 1.

Moreover, it should be pointed out that in the various examples of the pick-up device in accordance with the invention, the rectilinear displacement $d_1$ (FIGS. 3 to 5) or the pivoting motion $\theta$ (FIGS. 6 and 7), respectively on the part of the carrier element 1 or 30, is associated with the speed of rotation of the element and with the pitch of the recording track or tracks. A known kind of control system (not shown in the Figures) associated with the means producing the displacement $d_1$ or pivoting motion $\theta$, assists the proper positioning of the track in relation the fixed pick-up 13.

Self-evidently, the pick-up device in accordance with the invention can utilize not only an optical pick-up also a magnetic or mechanical one.

What I claim is:

1. A device for the optical read-out of a recording substrate, constituted by a flexible disc comprising at least one track carrying information, said device comprising: a base; a pick-up comprising a radiant energy source and a head, receiving said radiant energy and projecting a reading spot on said track, said pick-up being fixed on said base and having no contact with said substrate; a plate designed to receive said substrate and comprising a driving gear of said substrate, and means for displacing said substrate, designed for maintaining said spot on said tract during the reading out, said driving gear being movable in relation to said base, under the action of said displacing means, and having a travel long enough to make it possible to retract said substrate beyond said pick-up; said driving gear comprising a shaft with a shoulder against which said flexible disc seats, and a set of two flat supporting surfaces inclined in relation to a plane perpendicular to axis of rotation of said shaft; said displacing means comprising first means for producing a rectilinear displacement on the plate, comprising said gear and said inclined surfaces, so that said spot can remain on said track during the rotation of said disc, and second means producing a rectilinear displacement enabling said substrate to be retracted, whatever the position of said substrate be.

2. A device as claimed in claim 1, intended for the optical read-out of a recording substrate, wherein said fixed pick-up comprises a radiant energy source of the LASER type.

3. A device as claimed in claim 1, wherein said displacing means are driven by a control system which assists the proper positioning of said track in relation to said spot.

4. A device as claimed in claim 1, wherein said first and second rectilinear displacements take place along one and the same straight line.

5. A device as claimed in claim 1, wherein said plate rests upon an intermediate base, said intermediate base resting itself upon said base, the displacement produced by said first means corresponding to a displacement of the plate in relation to said intermediate base, and the displacement produced by said second means corresponding to the displacement of the intermediate base in relation to said fixed base.

6. A device as claimed in claim 5 wherein said first means produce a rectilinear displacement along a first axis and said second means produce a rectilinear displacement along a second axis, said first and second axis meeting at an angle and being contained in a plane perpendicular to the axis of rotation of said shaft.

7. A device as claimed in claim 1, wherein said displacing means comprise first means for producing a rectilinear displacement, associated with said driving gear which can displace in relation to said inclined surfaces, integral with the plate, and second means for producing a rectilinear displacement enabling said substrate to be retracted, whatever the position of said substrate be.

8. A device as claimed in claim 7, wherein said first and second rectilinear displacements take place along one and the same straight line.

9. A device as claimed in claim 7, wherein said inclined surfaces are fixed to a mobile intermediate base itself resting upon a fixed base; the displacement produced by said first means corresponding to a displacement of said gear in relation to said inclined surfaces and to the intermediate base upon which they are fixed and which is momentarily immobilised; and the displacement produced by said second means corresponding to the displacement of said intermediate base in relation to said fixed base.

10. A device as claimed in claim 9, wherein said first means produce a rectilinear displacement along a first axis and said second means produce a rectilinear displacement along a second axis, said first and second axis meeting at an angle and being contained in a plane perpendicular to the axis of rotation of said shaft.

11. A device as claimed in claim 1, wherein said substrate is constituted by a rigid disc; said driving gear designed to receive the rigid disc, is a circular table and comprises means for rotating said table about an axis; and said displacing means comprises first means producing a rectilinear displacement of the plate comprising said circular table and said rotating means, and second means producing a rectilinear displacement and enabling said substrate to be retracted whatever the position of said substrate be.

12. A device as claimed in claim 11, wherein said plate rests upon an intermediate base itself resting upon said base; wherein said displacement produced by said first means is a displacement of the plate in relation to said intermediate base, and displacement produced by said second means is a displacement of the intermediate base in relation to the fixed base.

13. A device as claimed in claim 12, wherein said rectilinear displacements take place along one and the same straight line.

14. A device as claimed in claim 12, wherein said displacements take place along two distinct axes contained in a plane perpendicular to the axis of rotation of said table.

* * * * *